(12) United States Patent
Elswick et al.

(10) Patent No.: US 7,257,309 B1
(45) Date of Patent: Aug. 14, 2007

(54) DISTRIBUTED STORAGE OF AUDIO/VIDEO CONTENT

(75) Inventors: William E. Elswick, Santa Monica, CA (US); John T. Hurst, Burbank, CA (US); Andrew H. Maltz, Sherman Oaks, CA (US); Nicholas J. Clay, Pacific Palisades, CA (US)

(73) Assignee: Avica Technology Corporation, Santa Monica, CA (US)

( * ) Notice: Subject to any disclaimer, the term of this patent is extended or adjusted under 35 U.S.C. 154(b) by 1190 days.

(21) Appl. No.: 10/091,908

(22) Filed: Mar. 5, 2002

(51) Int. Cl.
*G11B 27/02* (2006.01)
*H04N 5/91* (2006.01)

(52) U.S. Cl. .......................................... 386/46; 360/13
(58) Field of Classification Search ................ 386/33, 386/46, 79, 92, 95, 96, 108–112; 348/441, 348/512; 360/13, 22–27; 714/6, 8, 42; 711/114, 711/137; 707/200–705
See application file for complete search history.

(56) References Cited

U.S. PATENT DOCUMENTS

| | | | |
|---|---|---|---|
| 5,867,626 A * | 2/1999 | Kawakami et al. | 386/108 |
| 6,078,989 A * | 6/2000 | Kato et al. | 711/114 |
| 6,499,039 B1 * | 12/2002 | Venkatesh et al. | 707/204 |
| 6,950,966 B2 * | 9/2005 | Chiquoine et al. | 714/42 |
| 2002/0057893 A1 * | 5/2002 | Wood et al. | 386/46 |

OTHER PUBLICATIONS

"Bit Torrent" article on Wikipedia, Web printout of May 4, 2007, at http://en.wikipedia.org/wiki/BitTorrent.
Brian Dessent, "Brian's BitTorrent FAQ and Guide", Web printout of May 4, 2007, at http://dessent.net/btfaq/.
"BitTorrent" published by BitComet, Web printout of May 4, 2007, at http://wiki.bitcomet.com/help/BitTorrent.

* cited by examiner

*Primary Examiner*—Thai Q. Tran
*Assistant Examiner*—Mishawn Dunn
(74) *Attorney, Agent, or Firm*—Joseph G. Swan, PC

(57) ABSTRACT

Provided are systems and techniques for playing audio/video programs (e.g., movies) using a bank of networked audio/video players (e.g., digital projectors). Initially, a first portion (e.g., the majority) of an audio/video program is stored on a first audio/video player in a bank of networked audio/video players and a second portion (e.g., the balance) of the audio/video program is stored on a second audio/video player in the bank of networked audio/video players. An instruction to play the audio/video program (or a composition that includes the audio/video program) is input in the first audio/video player and, in response to that instruction, the second portion of the audio/video program is transferred from the second audio/video player to the first audio video player and the audio/video program is played on the first audio/video player.

27 Claims, 2 Drawing Sheets

DISTRIBUTED STORAGE OF AUDIO/VIDEO CONTENT

BACKGROUND OF THE INVENTION

1. Field of the Invention

The present invention relates to storing and playing audio and/or video content, such as full-length motion pictures, and particularly concerns systems and methods utilizing distributed storage of such content in the context of a bank of networked playing devices.

2. Description of the Related Art

Various conventional devices exist for playing stored programs or works. that include audio and/or video content. Such devices include CD players, videocassette players, DVD players, film-based movie projectors and, more recently, digital movie projectors. Most of such devices play audio/video content directly from a portable storage medium (e.g., a CD, videocassette film reel or DVD), sometimes after a limited amount of buffering. Others utilize internal or external storage devices, such as hard disk drives, into which the content is loaded before being played. In these latter devices, the work can be played from the external storage device, once again, typically after some amount of buffering.

When used, external storage devices may be directly connected to the player or may be connected via a network. The current thinking is that the use of a central networked storage device is preferred in connection with digital projectors, particularly in the context of digital projection cinemas.

Thus, the following approach has been proposed for implementing digital cinemas. A central server stores all movies to be played throughout the cinema and the individual players are connected via a network to the central server. When a movie is to be played by a particular digital projector, it is streamed to that projector on a real-time basis. This approach typically requires a high-capacity server and network, and has the further disadvantage that any failure of the network or the central server might shut down the entire theater.

SUMMARY OF THE INVENTION

The present invention takes an approach in which each individual audio/video player has its own associated storage device (which may be internal or external to the player). The simplest implementation of this approach would involve storing the entire movie or other audio/video work that is to be played by a particular player on the associated storage device for that player. However, the present inventor has discovered the following problems with this latter approach.

First, such an approach typically has the disadvantage that if the storage device (or, in certain cases, another portion of the player) becomes defective, it might be necessary to locate the media on which the movie was initially delivered and reload the movie. Not only is this process inconvenient, but it also typically requires that the cinema maintain a copy of each movie that it is showing on portable media, such as a set of DVDs. The requirement of storing such portable media for each work that is to be exhibited can pose a significant risk of theft or copying. In addition, when implemented in this manner, if the player or external storage device itself is stolen, the thief acquires a copy of the entire movie which is stored on it, which often will be far more valuable than even the playing device itself.

The present invention addresses these problems by storing portions of an audio/video program (such as a movie) on different networked devices and then retrieving such portions and playing the program in response to a play instruction.

Thus, in one aspect the invention is directed to playing audio/video programs (e.g., movies) using a bank of networked audio/video players (e.g., digital projectors). Initially, a first portion (e.g., the majority) of an audio/video program is stored on a first audio/video player in a bank of networked audio/video players and a second portion (e.g., the balance) of the audio/video program is stored on a second audio/video player in the bank of networked audio/video players. An instruction to play the audio/video program (or a composition that includes the audio/video program) is input in the first audio/video player and, in response to that instruction, the second portion of the audio/video program is transferred from the second audio/video player to the first audio video player and the audio/video program is played on the first audio/video player.

By virtue of this arrangement, it is possible to avoid the problems associated with having an entire movie or other audio/video program stored on a single server or other device, such as concerns about theft or malfunction of the device. In addition, the present invention can reduce network traffic by not having to download an entire movie or other program to a digital projector or other player on a real-time or near-real-time basis.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

The present disclosure is related to, and hereby incorporates by reference herein as though set forth herein in full, each of the following commonly-assigned patent applications: U.S. patent application Ser. No. 09/784,948 filed Feb. 15, 2001 and titled "Paging During Media Loading" (the '948 application); U.S. patent application Ser. No. 09/784,843 filed Feb. 15, 2001 and titled "Programming Content Distribution" (the '843 application); and the U.S. patent applications titled "Broadcast Message Management" (the Broadcast Message Management Application) and "Multi-Path Content Distribution and Aggregation" (the Multi-Path Content Distribution and Aggregation Application) filed concurrently herewith.

Briefly speaking, the present invention provides for distributed storage of audio/video content, works or programs, thereby often minimizing the results of player theft or malfunction. As used herein, unless the context requires otherwise, "audio/video" means any content that has audio and/or motion video components; and "program" means a work that is mainly intended to be played sequentially, such as a movie. However, a "program" also can include a work in which a user has some ability to alter what is to be played sequentially, such as is common in DVD versions of movies and in many video games. Frequently, such programs are fairly extensive, often including one or more continuous segments having very little repetition, each such segment requiring at least 2 minutes to play sequentially to completion (i.e., if no user interruption occurs) and, more often, requiring more than 5, 10, 15, 20, 30, 60, 90 or even 120 minutes to play. For instance, a typical movie is structured as a single continuous segment that includes 90 to 120 minutes of unique or non-repeating sequential content that might include two or more audio tracks (e.g., left and right stereo, alternate language tracks) and three or more video tracks (e.g., red-green-blue or luminance and two color difference values), all synchronized together.

System Architecture

Figure 1:
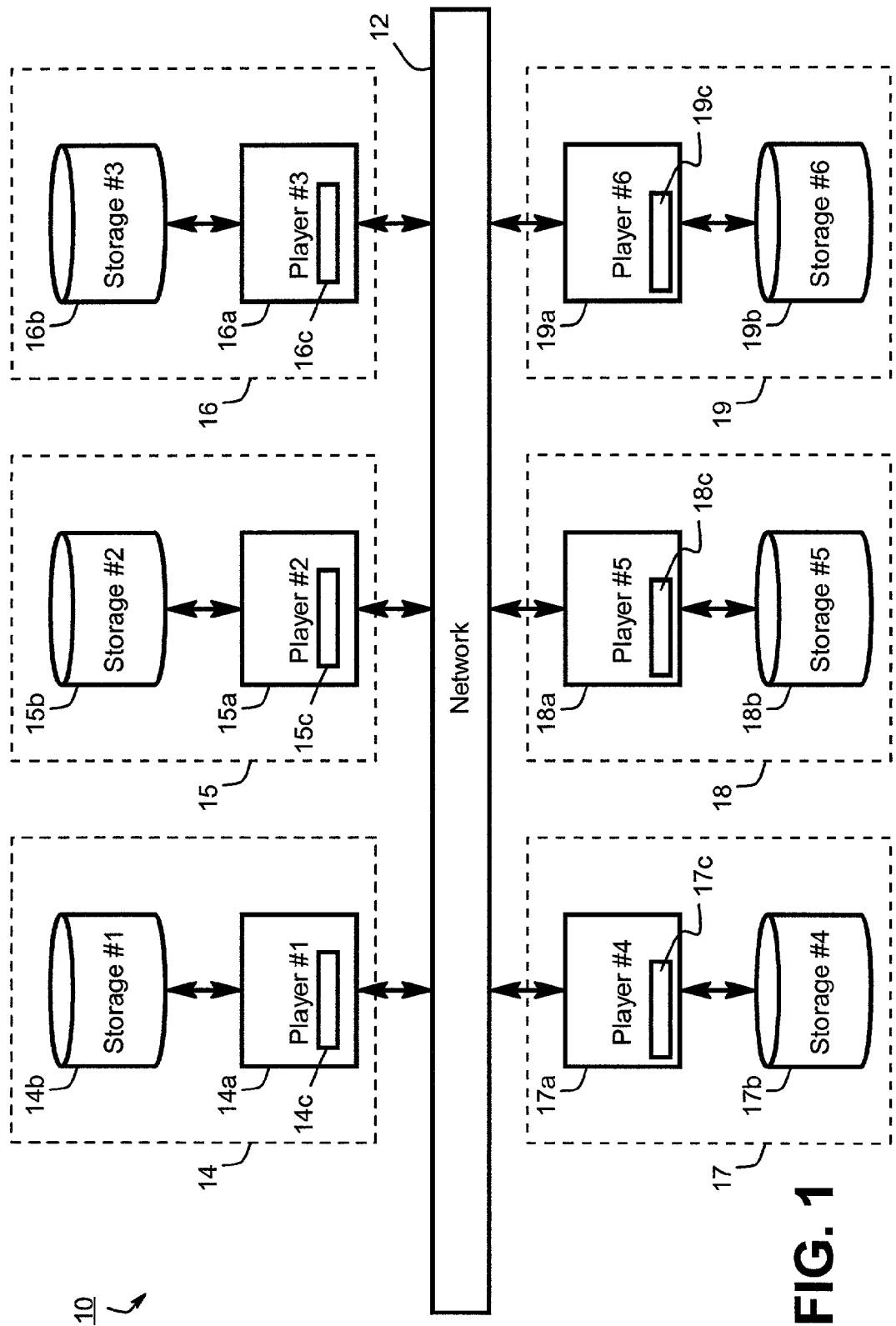
FIG. 1 is a block diagram of a system for implementing distributed content storage according to a representative embodiment of the present invention.

FIG. 1 illustrates a system 10 that includes a bank of audio/video playing devices 14–19. In the preferred embodiment of the invention, playing devices 14–19 are identical and include audio/video players 14a–19a (e.g., digital projectors) and attached dedicated mass storage devices 14b–19b. Preferably, storage devices 14b–19b are mirrored magnetic hard disk drives. However, storage devices 14b–19b may instead be any other types of storage devices utilizing any other type of storage medium, such as any other magnetic or optical storage medium.

While playing devices 14–19 are shown in FIG. 1 as including players 14a–19a and storage devices 14b–19b, it is also possible to provide the storage and playing functionality within separate devices. For purposes of the present invention, it generally is irrelevant whether a storage device 14b–19b is incorporated within the same box as or is external to its corresponding player 14a–19a, although it is preferable that each player 14a–19a has an associated storage device 14b–19b, meaning that each player 14a–19a has a corresponding storage device 14b–19b coupled to it through a connection (e.g., via a direct serial or parallel cable) other than network 12. While each player 14a–19a in FIG. 1 has a dedicated storage device 14b–19b, it is also to have a single one of storage devices 14b–19b connect to two or more players 14a–19a, using connections other than network 12. Also, while six players 14–19 are shown in FIG. 1, it should be understood that any number of such devices may be utilized. In fact, in many digital cinemas it might be common to have fifteen or more different projectors networked together.

Each of players 14–19 interfaces with a network 12 and therefore is capable of communicating with each other. Communications over network 12 may utilize the internet protocol (IP) or any other protocol. In certain embodiments of the invention, network 12 includes a router that connects network 12 either directly or indirectly to the Internet or to any other local, wide-area or far-reaching network. Included in each of players 14–19 is a portable media read or read/write device 14c–19c. In the preferred embodiment of the invention, devices 14c–19c are DVD reading devices for retrieving data from a DVD optical storage disk. Accordingly, in the preferred embodiment of the invention, audio/video content and other data can be input into any of players 14–19 by loading it from physical media via devices 14c–19c or by inputting such content or data via the player's connection to network 12.

In the current embodiment, input devices 14c–19c are incorporated into players 14a–19a. However, it should be noted that read or read/write devices 14c–19c may instead, or in addition, be provided in any or all of storage devices 14b–19b. Similarly, it is also possible to provide storage devices 14b–19b with a connection to network 12 in addition to, or instead of, the network connections provided to players 14a–19a.

Figure 2:
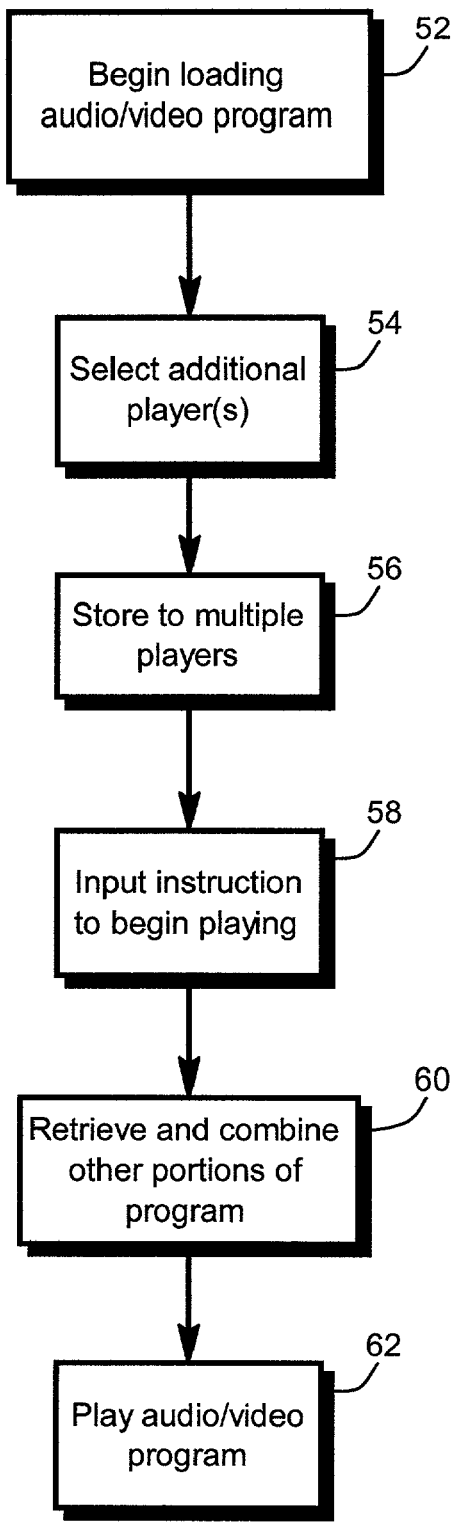
FIG. 2 is a flow diagram illustrating a technique for distributed content storage and for use of such stored content according to a representative embodiment of the present invention.

Content Storage and Use FIG. 2 illustrates a flow diagram for explaining a technique of storing audio/video content in a distributed manner and utilizing such stored content according to the present invention. For simplicity, the following discussion will refer to particular ones of players 14–19 and the sub-components thereof, it being understood that such specific references are intended merely to better illustrate the invention and not to limit the scope of the invention in any manner.

Initially, in step 52 the loading of an audio/video program into player 14 is initiated. In this regard, an audio/video program load may be initiated in any of a number of different ways. For instance, a user might open the DVD tray associated with DVD reader 14c in digital projector 14a, insert the first DVD in a set of DVDs that store a movie, close the tray, and then press a button that initiates the loading process. Upon completion of loading the first DVD, the remaining DVDs in the set are loaded in turn. Such a loading process might utilize the paging technique described in the '948 application or any of the techniques described in the Broadcast Message Management Application.

Alternatively, an audio/video program load may be initiated through any other instruction entered at the player 14 or received from another device via network 12 to begin loading the audio/video content over network 12. In the latter case, the instruction preferably indicates the player for which the program is being loaded (here, player 14), which is designated as the primary player.

In any event, in step 54 one or more additional players (designated as the secondary player(s)) are selected to store a portion of the audio/video program which is to be loaded. This step may be performed by player 14 or by any other device, such as any device on network 12. For example, this step may be performed by the same device into which the loading instruction was initially input or generated. In the current example, only one secondary player, player 15, is selected.

In step 56, the audio/video program is stored into the primary and secondary players. As noted above, in the preferred embodiment of the invention, for each audio/video program to be loaded there will be one primary player and one or more (more preferably, one) additional secondary players. More preferably, the primary player will be the one that is expected to play the program.

Preferably, the primary player stores from 80% and 95% of the audio/video program, with the remainder being stored on the secondary players. More preferably, the primary player stores approximately 90% of the audio/video program. However, any other distribution proportions may instead be used, although for the reasons discussed below it is preferable to store substantially more of the program on the primary player than on the secondary players.

The device that performs the function of dividing the audio/video content into such separate portions generally will depend upon the manner in which the program is being loaded. For example, if the program is being loaded from physical media directly into player 14, then player 14 preferably will be responsible for this function. If it is being loaded via network 12, then another device generally will perform this function, such as a central router or server.

Upon receipt of its portion of the program, the corresponding player 14a–19a causes such portion to be stored into its associated storage device 14b–19b. As noted above, it may be preferable to eliminate the intermediary role of players 14a–19a by incorporating a read or read/write device 14c–19c into the storage devices 14b–19b and/or by providing storage devices 14b–19b with a network connection.

In the preferred embodiment of the invention, the audio/video program previously has been divided into chunks using the techniques described in the '843 application. It is further preferable that the same chunks are preserved when the audio/video program is stored into plural of the storage devices 14b–19b. However, this is not strictly necessary.

In addition, it generally is preferable to store a backup copy of the audio/video program. Thus, for example, in a system that includes at least 12 audio/video players, 90% of the program could be stored on the primary audio/video player, the remaining 10% on a single secondary player, and then the full program could be duplicated by storing 10% on each of the third through twelfth players. In this way, in the event of loss of any single player, the audio/video program still could be reconstructed.

In the preferred embodiment of the present invention, the selection of any secondary player(s), the division of the audio/video program, and the routing of the different portions to the different players occur automatically by the devices in system 10 upon initiation of a loading process. Related functionality, such as the appropriate copying of any portions of a program, required due to the loss or replacement of any of the players 14a–19a or the storage devices 14b–19b may be performed manually, occur automatically, or any combination of the two.

With regard to the present example, it is preferable that system 10 maintain the distribution of each audio/video program and, preferably, the distribution of a duplicate copy thereof as described above. Thus, any changes in system 10 preferably are accompanied by appropriate data transfers (e.g., copying of the required audio/video program portions) to maintain this desired storage configuration.

Once an audio/video program has been stored in the foregoing manner, it may be played by the primary player 14 on system 10. Thus, in step 58 an instruction is input to begin playing a stored audio/video program. Such an instruction may be input at the device that will play the program (e.g., the primary player 14) or else may be input remotely (e.g., at a central control unit or server) and transmitted to the playing device 14 via network 12.

In response to the instruction input in step 58, in step 60 the other portions of the audio/video program required by player 14 are retrieved from the secondary player(s) (here, player 15), transferred (e.g., copied) to player 14, and combined together with the portion of the audio/video program stored on player 14. The retrieval process may be controlled by player 14 or by any other device on network 12.

The secondary portions of the program may be retrieved entirely in advance and then either (i) stored on player 14 prior to combination with the portion stored on player 14 or (ii) combined immediately upon retrieval. Alternatively, retrieval may occur on-the-fly (e.g., on an as-needed basis).

The content combination processing generally will be performed by primary player 14 and may utilize any of the techniques described in the '843 application. The combined content may either be stored into storage device 14b until ready to be played, stored into shorter term memory (e.g., RAM) until ready to be played, or played immediately, depending upon the timing of the combination processing.

In the preferred embodiment of the invention, the combined content at most is stored on a short-term basis, so that as little as possible of the complete copy of the program resides on primary player 14 at any given time.

As noted above, either or both of the retrieval and combination of the secondary portions of the audio/video programs in response to the instruction input in step 58 may occur immediately or may be delayed until a later time (e.g., as-needed). In addition, in alternative embodiments of the invention, the audio/video program may be included as part of a larger composition and may be retrieved and/or downloaded in response to an instruction to play such larger composition.

In step 62, the audio/video program as combined in step 60 is played by player 14. Conventional playing techniques may be used.

Hardware Considerations

Many of the methods and techniques described herein can be practiced with an open-architecture general-purpose digital processing system. Such a digital processing system typically will have interconnected, for example, at least some of the following components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse or other pointing device, control panel, keyboard, microphone or scanner), a mass storage unit (such as a hard disk drive), a real-time clock, a removable storage read or read/write device (such as for reading from and/or writing to a magnetic disk, a magnetic tape, an opto-magnetic disk, an optical disk such as a DVD, or the like), and a modem (which also may connect to the Internet or to any other computer network via a dial-up connection). In operation, the process steps to implement the above methods typically are stored in and executed out of ROM or RAM, but may instead initially be stored in mass storage (e.g., on the hard disk), downloaded into RAM, and then executed by the CPU out of RAM.

Various types of digital processing systems may be used depending upon the size and complexity of the tasks. In addition, although an open-architecture general-purpose digital processing system has been described above, a special-purpose system or computer may also be used. In particular, any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CDs and DVDs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM, which may be provided within a computer or other device.

Additional Considerations.

The above-described techniques provide for the division of an audio/video program into different portions for storage on different devices. Various techniques for performing such division may be utilized.

For instance, the different portions may be different sequential blocks of the program. More specifically, the secondary portion might consist of the first 10% of the program and the primary portion consist of the balance, the secondary portion might comprise 30-second (or any other duration) segments scattered throughout the program which together aggregate 10% of the program, or the secondary portion might comprise the last 10% of the program (or any other percentages may be used). Thus, in each of such embodiments, the secondary portion is contiguous with the primary portion when the program is played sequentially. Moreover, in such embodiments both the primary portion and the secondary portion(s) include all required data to play the program during their assigned time slots.

In alternative embodiments, both the primary portion and the secondary portion contain data which must be integrated (or synchronized) in order to play the program at a given moment in time. For instance, the secondary portion might include: (i) a subset of the video information (e.g., only one of the three video signals) for all or a portion of the program, (ii) some or all of the synchronization data required to play the program, and/or (iii) any combination of data segments extracted from the various audio and/or video tracks. By extracting and separately storing data that is integral to the program but not all the data that is necessary for a given time frame, a larger portion of the program can be affected while still maintaining the same proportion of secondary-to-primary content.

Finally, it should be noted that any combination of such techniques may be utilized for dividing an audio/video program according to the present invention. Naturally, the combination of such content in step 60 above will reflect the type of division performed in step 56.

When any of the foregoing systems and techniques are utilized in the context of a digital cinema, the networking of the various players 14 to 19 can permit relatively easy and automated reconfiguration for projecting different movies from the same projector. For instance, it is a relatively straightforward matter for a central controller device or server on network 12 to issue instructions to the various players 14 to 19 to effect data transfers required to change the audio/video program for which any of players 14 to 19 is the primary player. Thus, for example, if a first movie showing on player 14 turns out to be unexpectedly popular, while a second movie showing on player 15 turns out to be unexpectedly unpopular, then a central controller might instruct data transfers so that player 15 ceases to be a primary player for the second movie and instead becomes another primary player for the first movie. At the end of such data transfers, both players 14 and 15 might store 90% of the first movie with the remaining 10% being stored on one or more secondary players; as noted above, a duplicate backup copy of the first movie preferably also will be stored across multiple other players 14 to 19. At the same time, the second movie might be deleted entirely from the system 10, or else might remain on system 10 in the event it is contemplated that another projector will play that movie. It is noted that after such changes, player 15 might function as a secondary storage device for the second movie. Any such configuration changes preferably maintain the content distribution concepts discussed above with respect to each audio/video program that is to be played throughout system 10.

One of the main concepts of the present invention is the storage of different portions of a program (such as a movie) on different networked devices and the retrieval of such different portions at or around the time that the program is to be played. In the above embodiments of the invention, this concept is embodied in a system where each player has its own associated storage device. However, other embodiments also are possible. For instance, various storage devices which together store all of a program may be directly connected to network 12, and a player 14 retrieves the entire program from such storage devices and combines the different portions when playing the program.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

What is claimed is:

1. An apparatus for playing audio/video programs using a bank of networked audio/video players, said apparatus comprising:
   a. means for storing a first portion of an audio/video program on a first audio/video player in a bank of networked audio/video players;
   b. means for storing a second portion of the audio/video program on a second audio/video player in the bank of networked audio/video players;
   c. means for inputting an instruction to play the audio/video program in the first audio/video player; and
   d. means for, in response to the instruction input by said means (c), automatically transferring the second portion of the audio/video program from the second audio/video player to the first audio video player and causing the audio/video program to be played on the first audio/video player.

2. An apparatus according to claim 1, wherein the audio/video program is played sequentially on the first audio/video player.

3. An apparatus according to claim 1, wherein the first portion is substantially larger than the second portion.

4. An apparatus according to claim 1, wherein the first portion accounts for approximately 85 to 95% of the audio/video program.

5. An apparatus according to claim 1, wherein the second portion is contiguous with the first portion.

6. An apparatus according to claim 1, further comprising means for causing content from the second portion to be integrated with content from the first portion to provide content for playing at a given point in time.

7. An apparatus according to claim 1, wherein the audio/video program comprises a work that includes synchronized audio and video and is played sequentially by the first audio/video player.

8. An apparatus according to claim 1, further comprising means for storing a third portion of the audio/video program on a third audio/video player in the bank of networked audio/video players, and wherein also in response to the instruction input by said means (c), the third portion of the audio/video program is transferred from the third audio/video player to the first audio/video player.

9. An apparatus for playing audio/video programs using a bank of networked audio/video players, said apparatus comprising:
   a. means for storing a first portion of an audio/video program on a first audio/video player in a bank of networked audio/video players;
   b. means for storing a second portion of the audio/video program on a second audio/video player in the bank of networked audio/video players;
   c. means for inputting an instruction to play the audio/video program in the first audio/video player;
   d. means for, in response to the instruction input by said means (c) transferring the second portion of the audio/video program from the second audio/video player to the first audio video player and causing the audio/video program to be played on the first audio/video player; and
   e. means for loading the audio/video program into the bank of networked audio/video players and means for automatically dividing the audio/video program into the first portion and the second portion upon said loading.

10. An apparatus according to claim 9, further comprising means for automatically selecting the second audio/video player.

11. An apparatus for playing audio/video programs using a bank of networked audio/video players, said method comprising:
   a. means for storing a first portion of an audio/video program on a first audio/video player in a bank of networked audio/video players;
   b. means for storing a second portion of the audio/video program on a second audio/video player in the bank of networked audio/video players;
   c. means for inputting an instruction to play, in the first audio/video player, a composition that includes the audio/video program; and
   d. means for, in response to the instruction input by said means (c), automatically transferring the second portion of the audio/video program from the second audio/video player to the first audio video player and causing the audio/video program to be played on the first audio/video player.

12. An apparatus according to claim 11, wherein the audio/video program is played sequentially on the first audio/video player.

13. An apparatus according to claim 11, wherein the first portion is substantially larger than the second portion.

14. An apparatus according to claim 11, wherein the first portion accounts for approximately 85 to 95% of the audio/video program.

15. An apparatus according to claim 11, wherein the second portion is contiguous with the first portion.

16. An apparatus according to claim 11, further comprising means for causing content from the second portion to be integrated with content from the first portion to provide content for playing at a given point in time.

17. An apparatus according to claim 11, wherein the audio/video program comprises a work that includes synchronized audio and video and is played sequentially by the first audio/video player.

18. An apparatus according to claim 11, further comprising means for storing a third portion of the audio/video program on a third audio/video player in the bank of networked audio/video players, and wherein also in response to the instruction input by said means (c), the third portion of the audio/video program is transferred from the third audio/video player to the first audio/video player.

19. An apparatus for playing audio/video programs using a bank of networked audio/video players, said method comprising:
   a. means for storing a first portion of an audio/video program on a first audio/video player in a bank of networked audio/video players;
   b. means for storing a second portion of the audio/video program on a second audio/video player in the bank of networked audio/video players;
   c. means for inputting an instruction to play, in the first audio/video player, a composition that includes the audio/video program;
   d. means for, in response to the instruction input by said means (c) transferring the second portion of the audio/video program from the second audio/video player to the first audio video player and causing the audio/video program to be played on the first audio/video player; and
   e. means for loading the audio/video program into the bank of networked audio/video players and means for automatically dividing the audio/video program into the first portion and the second portion upon said loading.

20. An apparatus according to claim 19, further comprising means for automatically selecting the second audio/video player.

21. A method of playing audio/video programs using a bank of networked audio/video players, said method comprising:
   a. storing a first portion of an audio/video program on a first audio/video player in a bank of networked audio/video players;
   storing a second portion of the audio/video program on a second audio/video player in the bank of networked audio/video players;
   c. inputting an instruction to play the audio/video program in the first audio/video player; and
   d. in response to step (c), automatically transferring the second portion of the audio/video program from the second audio/video player to the first audio video player and causing the audio/video program to be played on the first audio/video player.

22. A system for playing audio/video programs using a bank of networked audio/video players, said system comprising:
   at least one computer-readable medium storing computer-executable process steps; and
   at least one processor configured to retrieve and execute said computer-executable process steps,
   wherein said process steps comprise steps to:
   a. store a first portion of an audio/video program on a first audio/video player in a bank of networked audio/video players;

b. store a second portion of the audio/video program on a second audio/video player in the bank of networked audio/video players;

c. input an instruction to play, in the first audio/video player, a composition that includes the audio/video program; and d. in response to the instruction input by said step (c), automatically transfer the second portion of the audio/video program from the second audio/video player to the first audio video player and cause the audio/video program to be played on the first audio/video player.

23. A system according to claim 22, wherein the audio/video program comprises a work that includes synchronized audio and video and is played sequentially by the first audio/video player.

24. A system according to claim 22, wherein the second portion is contiguous with the first portion.

25. A system according to claim 22, wherein said process steps further comprises a step to cause content from the second portion to be integrated with content from the first portion to provide content for playing at a given point in time.

26. A system according to claim 22, wherein said process steps further comprises a step to load the audio/video program into the bank of networked audio/video players and a step to automatically divide the audio/video program into the first portion and the second portion upon said loading.

27. A system according to claim 22, wherein said process steps further comprises a step to store a third portion of the audio/video program on a third audio/video player in the bank of networked audio/video players, and wherein also in response to the instruction input by said step (c), the third portion of the audio/video program is transferred from the third audio/video player to the first audio/video player.

* * * * *